United States Patent
Baldemor

(10) Patent No.: US 10,008,189 B1
(45) Date of Patent: Jun. 26, 2018

(54) GUITAR CLAMPS AND GUITAR CARRYING CASES

(71) Applicant: Jay Baldemor, Yorba Linda, CA (US)

(72) Inventor: Jay Baldemor, Yorba Linda, CA (US)

( * ) Notice: Subject to any disclaimer, the term of this patent is extended or adjusted under 35 U.S.C. 154(b) by 89 days.

(21) Appl. No.: 15/130,984

(22) Filed: Apr. 17, 2016

(51) Int. Cl.
  *G10G 7/00* (2006.01)
  *B65D 81/02* (2006.01)
  *A45C 13/02* (2006.01)
  *F16B 2/06* (2006.01)
  *B65D 81/127* (2006.01)

(52) U.S. Cl.
  CPC ............ *G10G 7/005* (2013.01); *A45C 13/02* (2013.01); *B65D 81/02* (2013.01); *B65D 81/127* (2013.01); *F16B 2/06* (2013.01)

(58) Field of Classification Search
  CPC ... G10G 7/005; F16B 2/10; F16B 2/06; B25B 1/00; B25B 3/00; B25B 5/00; B25B 1/2405; B25B 5/14; B25B 5/163; A45C 13/02; G10D 3/04
  USPC .............................................. 269/266, 43, 71
  See application file for complete search history.

(56) References Cited

U.S. PATENT DOCUMENTS

| | | | | |
|---|---|---|---|---|
| 4,621,558 | A * | 11/1986 | Cornette | G10D 3/043 84/318 |
| 2010/0270187 | A1* | 10/2010 | Sonoda | G10G 7/005 206/314 |
| 2014/0131235 | A1* | 5/2014 | Kushner | A45C 13/36 206/314 |
| 2017/0018263 | A1* | 1/2017 | Visesnut | G10D 1/08 |

FOREIGN PATENT DOCUMENTS

WO    WO-2016007097 A1 *   1/2016   ............... G10D 1/08

OTHER PUBLICATIONS

Gator Cases, GLELEC Lightweight Universal Electric Guitar Case; at URL http://www.zzounds.com/item—GATGLELEC; Dec. 2012. (Year: 2012).*
SKB66 guitar case; at URL HTTPS://www.sweetwater.com/store/detail/SKB66; Dec. 2011. (Year: 2011).*

* cited by examiner

Primary Examiner — Daniel J Colilla

(57) ABSTRACT

A guitar clamp is disclosed that can be used to secure the neck portion of a guitar within a guitar case. The guitar clamp includes a base component that has a guitar neck support surface; a left side that is contiguous with the support surface; and a right side that includes a first wall, which protrudes outward from the support surface. The guitar clamp further includes a top component that has a clamp surface that is configured to rest adjacent to a set of strings of the guitar neck; a right side that is contiguous with the clamp surface; and a left side that includes a second wall, which protrudes outward from the clamp surface. The base component is configured to be combined with the top component, such that the base component and top component securely surround a portion of the guitar neck. Guitar cases that include such guitar clamps are also disclosed.

8 Claims, 4 Drawing Sheets

US 10,008,189 B1

GUITAR CLAMPS AND GUITAR CARRYING CASES

FIELD OF THE INVENTION

The field of the present invention relates to devices for securing and protecting a guitar and, more particularly, to devices for securing and protecting a guitar when disposed within a guitar carrying case.

BACKGROUND OF THE INVENTION

Musicians routinely use specialized cases to store, protect, and transport a guitar from one place to another. Such cases generally conform to the peripheral shape of a guitar (or other string instrument). However, due to the exterior configuration of guitars and their corresponding cases, the neck portion of a guitar is often left unsecure within commercially-available carrying cases. When the neck portion of a guitar is not sufficiently secured, the guitar may be allowed to move within the case, which is undesirable insofar as such movement may damage the guitar or the neck portion thereof. Others have attempted to solve this problem by positioning foam (or solid) blocks around periphery of a guitar neck (when disposed within a case). However, those solutions have proven to have several drawbacks, namely, such prior art devices often do not effectively secure and immobilize the guitar neck and, furthermore, the configuration of such blocks renders positioning a guitar within a carrying case more burdensome.

In view of the foregoing, there is a continuing need for improved devices that can effectively secure and immobilize a guitar neck within a carrying case, which further allow a guitar to be easily placed within (and removed from) a carrying case. As the following will demonstrate, the devices of the present invention address such demands (and others) in the marketplace.

SUMMARY OF THE INVENTION

According to certain aspects of the invention, guitar clamps are provided that are configured to be nestably positioned within a guitar case. The guitar clamps are further configured to securely hold and support a neck portion of a guitar within a guitar case, so that the guitar neck is prevented from moving within the guitar case during transport. The guitar clamp generally includes a base component that has a guitar neck support surface; a left side that is contiguous with the support surface; and a right side that includes a first wall. The invention provides that the first wall protrudes outward from the support surface. The guitar clamp further includes a separate top component that has a clamp surface that is configured to rest adjacent to the strings of the guitar neck; a right side that is contiguous with the clamp surface; and a left side that includes a second wall, which protrudes outward from the clamp surface. The base component is configured to be combined with the top component, such that the base component and top component can be positioned to securely surround a portion of the guitar neck (and the guitar clamp and guitar may then be positioned within a guitar case).

According to additional aspects of the invention, guitar carrying cases are provided, which include the guitar clamps described herein. The guitar clamps may be removable from, or partially fixed within, the interior of a guitar case, as described further below.

The devices of the present invention set forth above are described in further detail below in the Detailed Description of the Invention section.

DETAILED DESCRIPTION OF THE INVENTION

Figure 1:
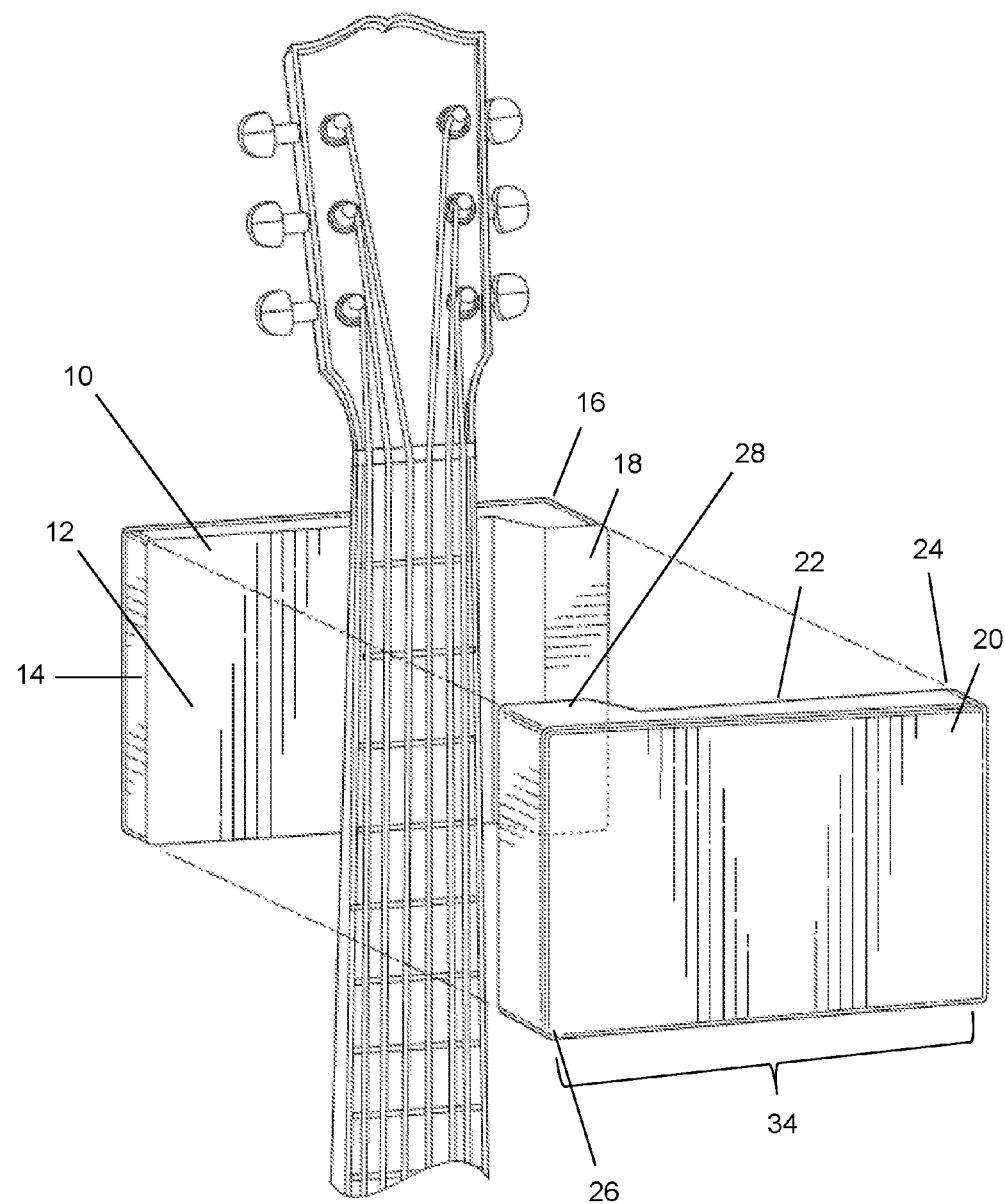
FIG. 1 is a perspective view of a guitar clamp, with a portion of a guitar neck disposed between the base component and top component of the guitar clamp.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-5, according to certain preferred embodiments of the present invention, guitar clamps are provided that are configured to be nestably positioned within a guitar case. The guitar clamps are configured to securely hold and support a neck portion of a guitar within a guitar case, so that the guitar neck is prevented from moving within the guitar case during transport. The guitar clamps of the present invention generally include a base component 10 that has a guitar neck support surface 12. In addition, the base component 10 comprises a left side 14 that is contiguous (i.e., co-planar or approximately co-planar) with the support surface 12 and a right side 16 that includes a first wall 18. The invention provides that the first wall 18 protrudes outward from the support surface 12.

Figure 2:
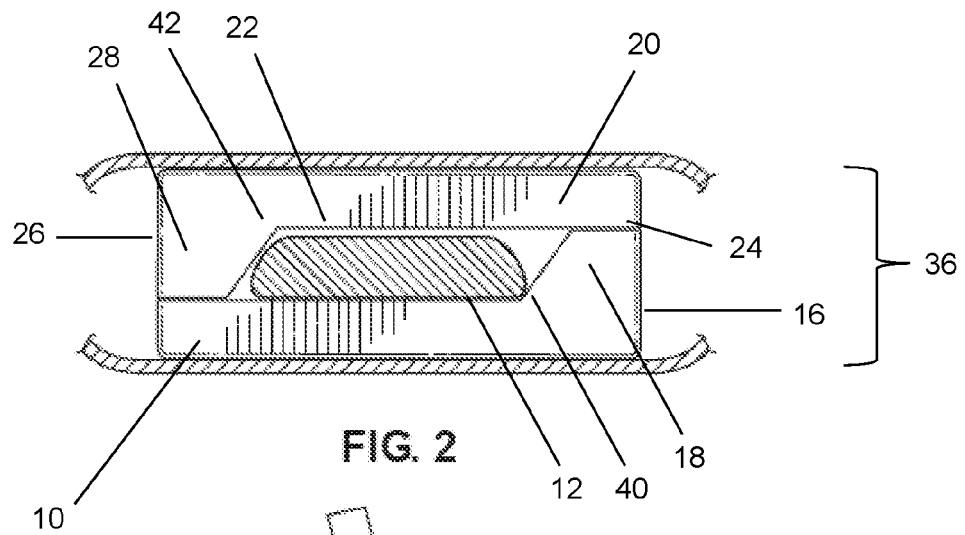
FIG. 2 is a top view of a guitar clamp, with a portion of a guitar neck disposed between the base component and top component of the guitar clamp.
Figure 3:
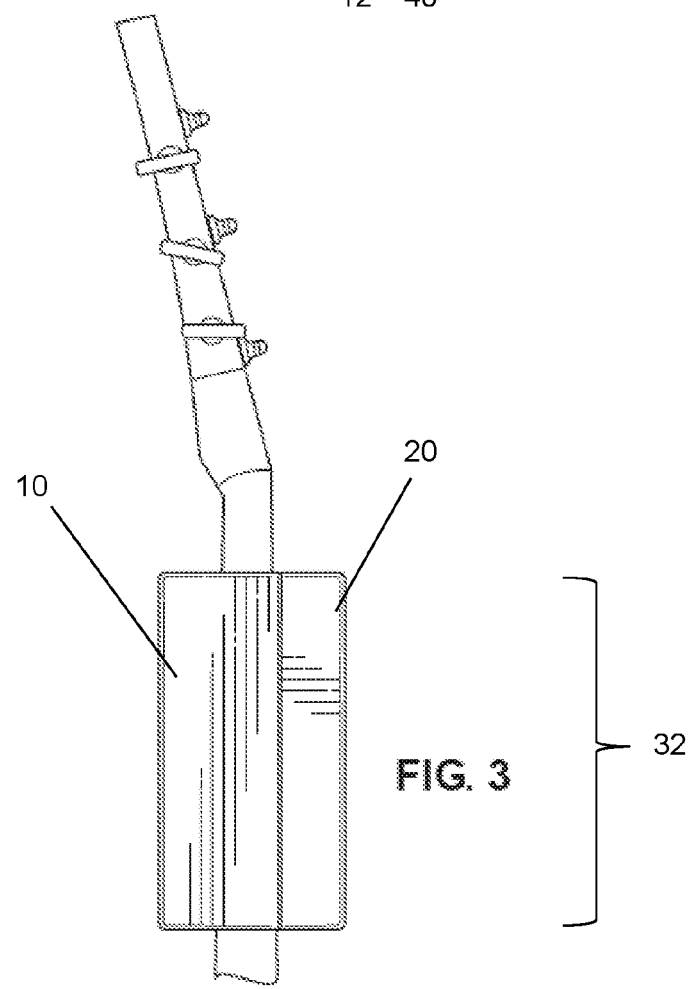
FIG. 3 is a side view of a guitar clamp, with a portion of a guitar neck disposed between the base component and top component of the guitar clamp.

The guitar clamp of the present invention further includes a separate top component 20 that has a clamp surface 22 that is configured to rest adjacent to the strings of the guitar neck. In addition, the top component 20 includes a right side 24 that is contiguous (i.e., co-planar or approximately co-planar) with the clamp surface 22 and a left side 26 that includes a second wall 28, which protrudes outward from the clamp surface 22. The base component 10 is configured to be combined with the top component 20, as illustrated in FIGS. 1 and 2, such that the base component 10 and top component 20 securely surround a portion of the guitar neck, when the guitar clamp and guitar are positioned within a guitar case 30. The invention provides that the base component 10 is configured such that the neck portion of a guitar may be placed on its support surface 12, by moving the neck portion of a guitar from the left side 14 of the guitar clamp (which is contiguous with the support surface 12) to the middle area of the support surface 12. Next, the top component 20 may be applied over the top of the guitar neck, such that the top component 20 is combined with the base component 10, with the guitar neck disposed between such components, as illustrated in FIGS. 1 and 2.

The invention provides that when the base component 10 and top component 20 are combined, the guitar clamp is dimensioned and configured to nestably and securely reside within a guitar case 30. In certain preferred embodiments, the base component 10 exhibits a length 32 (FIG. 3) and width 34 (FIG. 1) that are identical to the length 32 and width 34 of the top component 20. Still further, in certain embodiments, when the base component 10 and top component 20 are combined, the thickness 36 (FIG. 2) of the guitar clamp may be the same on both sides. In other embodiments, however, when the base component 10 and top component 20 are combined, the thickness 36 of the guitar clamp may be different on both sides. According to certain preferred embodiments, the first wall 18 will preferably run the entire length 32 of the base component 10 and the second wall 28 will preferably run the entire length 32 of the top component 20. In addition, the invention provides that the first wall 18 preferably protrudes from the support surface 12 a distance that is equal to the distance by which the second wall 28 protrudes from the clamp surface 22.

Figure 4:
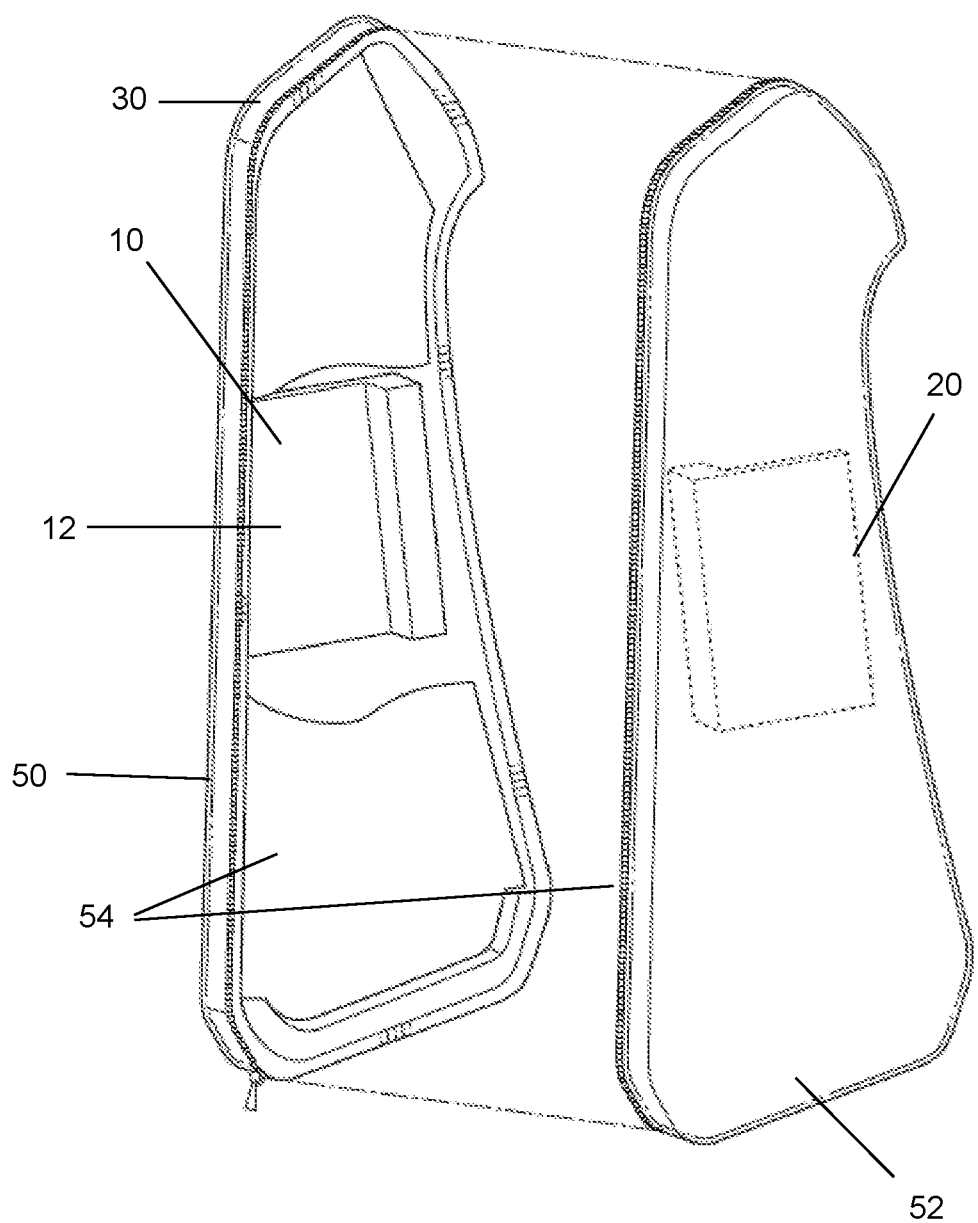
FIG. 4 is a perspective view of a disassembled guitar case, showing the location of the guitar clamp described herein.
Figure 5:
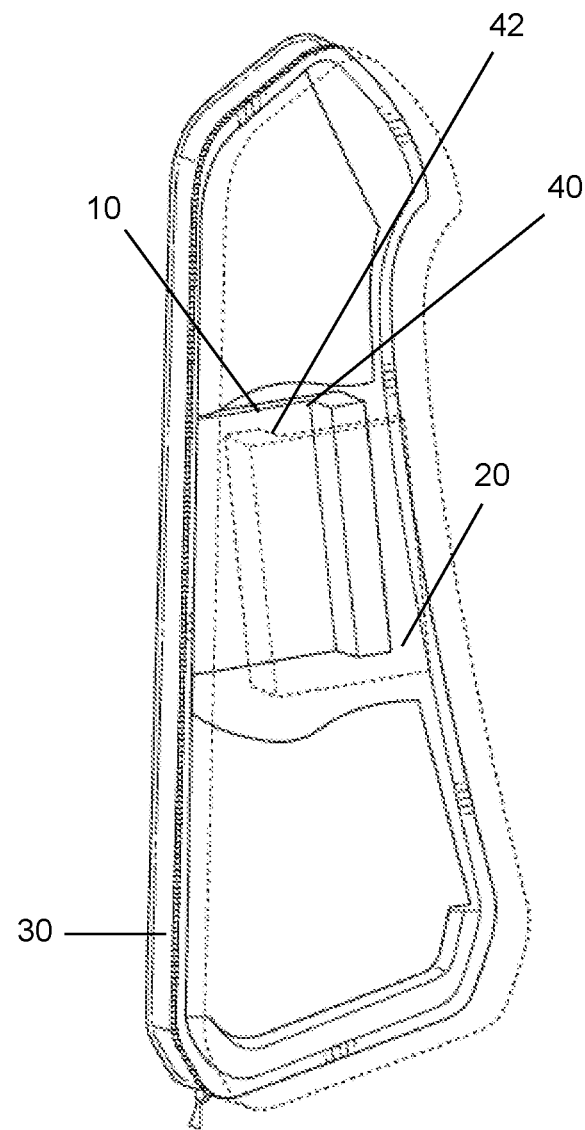
FIG. 5 is a perspective view of an assembled guitar case, showing the location of the guitar clamp described herein.

The invention further provides that the angle 40 between the first wall 18 and the support surface 12, and the angle 42 between the second wall 28 and the clamp surface 22, may be configured in different ways. For example, in certain embodiments, the guitar clamp may be configured such that a 90-degree angle 40 exists between the first wall 18 and the support surface 12. Likewise, in such embodiments, a 90-angle 42 will preferably exist between the second wall 28 and the clamp surface 22, as illustrated in FIGS. 4 and 5. In other embodiments, the guitar clamp may be configured such that an obtuse angle 40 exists between the first wall 18 and the support surface 12; and an obtuse angle 42 exists between the second wall 28 and the clamp surface 22, as illustrated in FIGS. 1 and 2. The invention provides, however, that the two angles 40,42 will preferably be approximately the same (or identical).

The invention provides that the guitar clamp, including the base component 10 and top component 20, may be comprised of and manufactured from a variety of materials. In certain preferred embodiments, the guitar clamp will be comprised of a relatively soft, non-abrasive material, which prevents scraping or other exterior damage to a guitar neck. For example, in certain embodiments, the guitar clamp—or at least the support surface 12 of the base component 10 and the clamp surface 22 of the top component 20—are made of foam, fabric, or other non-abrasive materials (e.g., cloth, cardboard, wood, plastics, elastomers, etc.).

According to yet further preferred embodiments of the present invention, guitar carrying cases 30 are provided, which include the guitar clamps described herein. More particularly, the invention provides that the guitar clamps may be removable from, or fixed within, the interior of a guitar case 30. More specifically, the invention further encompasses a guitar case 30 that includes a first side 50, a second side 52, and an interior area 54 that exists between the first side 50 and the second side 52 that is configured to receive and store a guitar. In these embodiments, the invention provides that the carrying case 30 will further comprises a guitar clamp, as described herein. The invention provides that the size and dimensions of the guitar clamp will be preferably configured so that the guitar clamp will securely and tightly fit within the interior area 54 of the guitar case 30. The invention provides that, in certain embodiments, both the base component 10 and top component 20 may be removed from within the interior area 54 of the guitar case 30 (such that both components may be applied to the neck portion of a guitar, prior to placing the guitar within a guitar case 30). In other embodiments, the base component 10 may be integrally formed with the interior area 54 of the guitar case 30, while leaving the top component 20 as a separate and non-integrated component of the guitar case 30, so that the top component 20 may be removed to allow a guitar neck to be placed on the support surface 12 of the base component 10, before the top component 20 is positioned on top of the guitar neck. According to yet further embodiments, the invention provides that the base component 10 and the top component 20 may both be integrally formed with the interior area 54 of the guitar case 30, e.g., the base component 10 may be integrally formed with the first side 50 of the guitar case 30, while the top component 20 may be integrally formed with the second side 52 of the guitar case 30.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A guitar clamp, which comprises:
   (a) a base component that includes (i) a support surface that is configured to receive and support a backside of a guitar neck, (ii) a left side that is contiguous with the support surface, and (iii) a right side that includes a first wall, which protrudes outward from the support surface; and
   (b) a top component that includes (i) a clamp surface that is configured to rest adjacent to a set of strings of the guitar neck, (ii) a right side that is contiguous with the clamp surface, and (iii) a left side that includes a second wall, which protrudes outward from the clamp surface, wherein the base component is configured to be combined with the top component, such that the base component and top component surround a portion of the guitar neck, wherein:
   the base component and top component, when combined, are configured to nestably and securely reside within a guitar case;
   the base component exhibits a length and width that are identical to a length and width of the top component;
   the first wall runs an entire length of the base component and the second wall runs an entire length of the top component; and
   the first wall protrudes from the support surface a distance that is equal to a distance by which the second wall protrudes from the clamp surface.

2. The guitar clamp of claim 1, wherein at least the support surface of the base component and the clamp surface of the top component are made of foam, fabric, or a non-abrasive material.

3. The guitar clamp of claim 2, wherein a 90-degree angle exists between the first wall and the support surface; and a 90-angle exists between the second wall and the clamp surface.

4. The guitar clamp of claim 2, wherein an obtuse angle exists between the first wall and the support surface; and an obtuse angle exists between the second wall and the clamp surface.

5. A guitar carrying case, which comprises a first side, a second side, and an interior area that exists between the first side and second side that is configured to receive and store a guitar, wherein the carrying case further comprises a guitar clamp, wherein the guitar clamp comprises:
   (a) a base component that includes (i) a support surface that is configured to receive and support a backside of a guitar neck, (ii) a left side that is contiguous with the support surface, and (iii) a right side that includes a first wall, which protrudes outward from the support surface; and
   (b) a top component that includes (i) a clamp surface that is configured to rest adjacent to a set of strings of the guitar neck, (ii) a right side that is contiguous with the clamp surface, and (iii) a left side that includes a second wall, which protrudes outward from the clamp surface, wherein the base component is configured to be combined with the top component, such that the base component and top component surround a portion of the guitar neck, wherein:
      the base component and top component of the guitar clamp, when combined, are configured to nestably and securely reside within the guitar case;
      the base component exhibits a length and width that are identical to a length and width of the top component;
      the first wall runs an entire length of the base component and the second wall runs an entire length of the top component; and
      the first wall protrudes from the support surface a distance that is equal to a distance by which the second wall protrudes from the clamp surface.

6. The guitar carrying case of claim 5, wherein at least the support surface of the base component and the clamp surface of the top component are made of foam, fabric, or a non-abrasive material.

7. The guitar carrying case of claim 6, wherein a 90-degree angle exists between the first wall and the support surface; and a 90-angle exists between the second wall and the clamp surface.

8. The guitar carrying case of claim 6, wherein an obtuse angle exists between the first wall and the support surface; and an obtuse angle exists between the second wall and the clamp surface.

\* \* \* \* \*